United States Patent Office 2,860,083
Patented Nov. 11, 1958

2,860,083

SILICONE RUBBER ADHESIVE

Siegfried Nitzsche and Manfred Wick, Burghausen, Germany, assignors to Wacker-Chemie G. m. b. H., Munich, Bavaria, Germany No Drawing. Application December 24, 1956
Serial No. 630,063

Claims priority, application Germany January 7, 1956

4 Claims. (Cl. 154—139)

This invention is concerned with a composition of matter which is particularly suitable for bonding silicone rubber to a wide variety of base members and to a method for obtaining such bonding.

The problem of obtaining a satisfactory bond between silicone rubber and various base members such as metal, glass, synthetic resins and so forth has been a very difficult one to solve because the silicone rubber is repellent to the usual adhesives. The adhesives apparently do not wet the surface of the silicone rubber and uneven bonding or no bonding results.

Bonding between silicone rubber and metal, glass or other surfaces has heretofore been achieved by employing alkylorthosilicates as priming agents. The base member had to be thoroughly cleaned to remove grease and other contaminants. The orthosilicate primer would then be applied and allowed to air-dry for several hours. Then the vulcanized silicone rubber would be applied and the bond would be obtained by a further cure at elevated temperature with pressure usually being required.

The bonding obtained by the method outlined above was unsatisfactory because the results were variable. Factors such as humidity, room temperature, cleanliness of the surface, characteristics of the silicone rubber and so forth, many of which were uncontrollable, resulted in unsatisfactory bonding. Even within a single unit of silicone rubber bonded to metal one would find spots where no adhesion between the metal and the silicone rubber had been obtained. Such uneven bonding was obviously unsatisfactory.

Furthermore, the methods heretofore employed to bond silicone rubber to other materials required the use of pressure. Obviously, if the use of pressure can be avoided, a more economical process and a faster one is likely to be achieved. Also, base members having curved surfaces or other non-planar surfaces, and base members having large surface areas have been especially hard to bond to silicone rubber.

It has been known for some time that the problem of bonding silicone rubber to various base members is more acute when active fillers such as fume silica are employed in the silicone rubber. This accentuates the problem because the silicone rubber containing active silica is a superior product to the silicone rubber containing an inactive filler.

Recent developments in the use of silicone rubber in prosthodontia as well as in other fields have led to a further search for a satisfactory means of adhering or bonding silicone rubber to various solid base members. A new method for securing bonding would open the way for wider use of silicone rubber and would be very beneficial to the producers of such material.

It is an object of the present invention to provide a method for bonding silicone rubber to base members such as glass, metal, organic resins and so forth. A further object is to provide an inexpensive and dependable means for securing bonding between silicone rubber and other materials without the use of extensive pressure. Another object is to provide a means for adhering silicone rubber to materials having broad surfaces or irregularly shaped surfaces. Other objects and advantages of the present invention are specifically disclosed or will be readily apparent from the disclosure and claims which follow.

The present invention relates to a composition of matter suitable for overcoming the above difficulties in obtaining bonding between silicone rubber and various base materials, said composition consisting essentially of (a) 30 to 70 percent by weight of a diorganopolysiloxane soluble in organic solvents and having a viscosity between 10,000 and 20,000,000 cs. at 25° C., the organic groups in said siloxane being alkyl, aryl or alkenyl radicals or any combination thereof, (b) 2 to 20 percent by weight of an organopolysiloxane resin of the formula

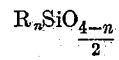

where R represents alkyl radicals, aryl radicals or alkenyl radicals and $n$ has an average value of 0.9 to 1.8, (c) 10 to 65 percent by weight of calcium carbonate having a particle size of less than 100 microns, and (d) 2 to 4 percent by weight of an organic peroxide.

The diorganopolysiloxanes employed herein as ingredient (a) are well known in the art and methods of producing such materials are old and well documented. These materials are homopolymers or copolymers containing repeating units of the formula $R_2SiO$ wherein R represents organic radicals such as alkyl radicals, e. g. methyl, ethyl, propyl and octadecyl; aryl radicals, e. g. phenyl and tolyl; and alkenyl radicals, e. g. vinyl, allyl and octadecenyl. R can represent the same or different radicals in a single unit and various units in a single molecule can be the same or different. Included specifically herein are dimethylpolysiloxanes, methylphenylpolysiloxane, methylvinylpolysiloxanes and copolymers of such units such as copolymers containing dimethyl- and phenylmethylsiloxane units, and copolymers containing phenylmethyl-, dimethyl- and vinylmethylsiloxane units.

The diorganopolysiloxanes are employed to the extent of 30 to 70 percent by weight of the composition. It is preferred that the diorganopolysiloxane have a viscosity exceeding 1,000,000 cs. at 25° C. Thus diorganopolysiloxane gums are preferred to the lower molecular weight liquids.

The organopolysiloxane resins employed herein as ingredient (b) have the unit formula

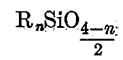

where R is as above defined and $n$ has an average value of 0.9 to 1.8. Homopolymers or copolymers can be employed herein. Specific examples of operable resins are methylsiloxane, phenylsiloxanes and methylphenylsiloxanes. These resins are well known in the art and the methods of producing such resins are well known and thoroughly documented in the art.

The third ingredient employed herein is calcium carbonate. For satisfactory bonding and consistent results, it has been found that calcium carbonate having an average particle size of less than 100 microns should be employed. When larger particles are employed, the results are generally superior to those heretofore obtained, but for consistently good bonding and superior adhesion between the materials, the particles should be smaller than 100 microns.

The organic peroxide set forth as ingredient (d) herein is employed in minor amounts and acts as a vulcanizing agent. Specific examples of peroxides which are operative herein include dicumyl peroxide, di-tertiary butyl peroxide, benzoyl peroxide, tertiary butyl perbenzoate, acetyl peroxide, tertiary butyl hydroperoxide, 2,4,2¹,4¹,tetrachlorodibenzoyl peroxide, and tertiary amylbutyl peroxide.

The above ingredients can be admixed by any desired means. A two or three roll mill is particularly useful for mixing the ingredients. If necessary the siloxane components (a) and (b) can be dissolved in an organic solvent such as benzene or toluene prior to admixing. This will make the mixing step easier, but the solvent must be removed from the mixture before the base member and silicone rubber are brought into contact with each other.

The mixture can be applied to the base member alone or to the silicone rubber layer alone or to both. It can be applied in an undiluted form using a spatula or it can be applied as a solution in organic solvent by spraying, brushing, dipping, etc. When a solution of the adhesive in an organic solvent is employed, the solvent is allowed to evaporate prior to application of the silicone rubber to the coated surface.

The silicone rubber layer can be applied either as a vulcanized sheet or as an unvulcanized silicone rubber stock. If the unvulcanized silicone rubber stock is employed, the rubber is vulcanized in situ simultaneously with the curing of the adhesive layer.

The adhesive film or layer is cured with or without pressure at moderate temperatures in the range of 80° C. to 250° C. Needless to say, the higher the curing temperature, the shorter will be the cure time. Thus at 120° C. the cure is completed in 15 minutes; at 150° C. less than 15 minutes will be required and at 100° C. more than 15 minutes will be required.

The following examples are included herein to aid those skilled in the art to better understand and practice the present invention. The examples are not intended to restrict the scope of the present invention. All parts and proportions in the examples are based on weight.

Example 1

100 g. of dimethylpolysiloxane having a molecular weight of about 400,000, 10 grams of an organosiloxane resin copolymer containing 80 mol percent $CH_3SiO_{3/2}$ units and 20 mol percent $(CH_3)_2SiO$ units, 50 grams of a calcium carbonate having a particle size of less than 100 microns and 4 grams of benzoyl peroxide were thoroughly mixed on a roll mill. A thin film (.5 mm. thick) of the mixture was applied using a spatula to a piece of sheet iron which had been cleaned and degreased prior to the application of the mixture. A vulcanized sheet of silicone rubber was placed on the primed surface of the iron and smoothed down to eliminate air pockets and to obtain contact between the rubber and the adhesive coating. The assembly was heated at 120° C. for 15 minutes to cure the adhesive. The silicone rubber was firmly and uniformly bonded to the sheet iron by this method.

Example 2

Employing a mixture prepared as in Example 1, a 50 percent solids in toluene solution was prepared. A clean, greaseless steel roll was coated with the solution and the toluene was allowed to evaporate leaving a film of adhesive evenly distributed on the surface of the steel roll. An unvulcanized layer of silicone rubber 5 mm. thick was then wound around the steel roll and the entire assembly was wrapped with linen tape. The assembly was heated for one hour in a steam boiler at 3.5 atmospheres of vapor pressure. The linen tape was then removed and the silicone rubber was found to be vulcanized and firmly bonded to the steel cylinder.

Example 3

The surface of a sheet of a phenol formaldehyde resin was roughened with coarse sandpaper. A .5 mm. film of the adhesive prepared in Example 1 was applied to the roughened surface with a spatula. A piece of vulcanized silicone rubber, 2 mm. thick, was applied to the coated surface and the assembly was heated at 120° C. for 15 minutes at a pressure of .5 kg. per sq. cm. A firm bond between the silicone rubber and the phenolic resin sheet was obtained.

Example 4

Equivalent results are obtained when a methylphenylsiloxane is substituted for the dimethylsiloxane of Example 1.

Example 5

Equivalent results are obtained when a copolymer of 70 mol percent dimethylsiloxane, 15 mol percent of phenylmethylsiloxane, 10 mol percent diphenylsiloxane and 5 mol percent methylvinylsiloxane is substituted for the dimethylsiloxane of Example 1.

Example 6

Equivalent results are obtained employing a resin containing 50 mol percent methylsiloxane, 40 mol percent phenylsiloxane and 10 mol percent phenylvinylsiloxane is substituted for the resin in Example 1.

Example 7

Equivalent results are obtained using tertiary butyl perbenzoate or tetrachlorodibenzoyl peroxide as the vulcanizing agent in Example 1.

That which is claimed is:

1. A composition of matter consisting essentially of (a) 30 to 70 percent by weight of a diorganopolysiloxane which is soluble in benzene and having a viscosity of between 10,000 and 20,000,000 cs. at 25° C., the organic groups in said siloxane being selected from the group consisting of alkyl radicals, aryl radicals and alkenyl radicals, (b) 2 to 20 percent by weight of an organopolysiloxane resin of the formula $$R_nSiO_{\frac{4-n}{2}}$$

where n has an average value of from 0.9 to 1.8 and R is a radical selected from the group consisting of alkyl radicals, aryl radicals and alkenyl radicals, (c) 10 to 65 percent by weight of calcium carbonate having a particle size of less than 100 microns, and (d) 2 to 4 percent by weight of an organic peroxide.

2. A composition of matter consisting essentially of (a) 30 to 70 percent by weight of dimethylpolysiloxane gum soluble in benzene, (b) 2 to 20 percent by weight of a methylpolysiloxane resin having from .9 to 1.8 methyl radicals per silicon atom, (c) 10 to 65 percent by weight of calcium carbonate having an average particle size of less than 100 microns and (d) 2 to 4 percent by weight of an organic peroxide selected from the group consisting of benzoyl peroxide, tertiary butyl perbenzoate, di-tertiary butyl peroxide and tetrachlorodibenzoyl peroxide.

3. A method for bonding silicone rubber to a solid base member consisting essentially of cleaning the base member to remove foreign matter, contaminants and grease, applying to the cleaned surface a composition of matter consisting essentially of (a) 30 to 70 percent by weight of a diorganopolysiloxane which is soluble in benzene and having a viscosity of between 10,000 and 20,000,000 cs. at 25° C., the organic groups in said siloxane being selected from the group consisting of alkyl radicals, aryl radicals and alkenyl radicals, (b) 2 to 20 percent by weight of an organopolysiloxane resin of the formula $$R_nSiO_{\frac{4-n}{2}}$$

where n has an average value of from 0.9 to 1.8 and R is a radical selected from the group consisting of alkyl radicals, aryl radicals and alkenyl radicals, (c) 10 to 65 percent by weight of calcium carbonate having a particle size of less than 100 microns, and (d) 2 to 4 percent by weight of an organic peroxide, applying a layer of silicone rubber on the coated surface and heating to obtain a permanent bond between the silicone rubber and the solid base member.

4. A method for bonding silicone rubber to a solid base member consisting essentially of cleaning the base member to remove foreign matter, contaminants and grease, applying to the cleaned surface a composition of matter consisting essentially of (a) 30 to 70 percent by weight of dimethylpolysiloxane gum soluble in benzene, (b) 2 to 20 percent by weight of a methylpolysiloxane resin having from .9 to 1.8 methyl radicals per silicon atom, (c) 10 to 65 percent by weight of calcium carbonate having an average particle size of less than 100 microns, and (d) 2 to 4 percent by weight of an organic peroxide selected from the group consisting of benzoyl peroxide, tertiary butyl perbenzoate, di-tertiary butyl peroxide and tetrachlorodibenzoyl peroxide, applying a layer of silicone rubber on the coated surface and heating to obtain a permanent bond between the silicone rubber and the solid base member.

References Cited in the file of this patent

UNITED STATES PATENTS

| | | |
|---|---|---|
| 2,442,196 | Coggeshall | May 25, 1948 |
| 2,601,337 | Smith-Johannsen | June 24, 1952 |